United States Patent [19]

Sogawa

[11] Patent Number: 5,526,267
[45] Date of Patent: Jun. 11, 1996

[54] CONTROL METHOD FOR A VEHICLE WITH MAIN AND SUB COMPUTERS

[75] Inventor: Yoshiyuki Sogawa, Mitaka, Japan

[73] Assignee: Fuji Jukogyo Kabushiki Kaisha, Japan

[21] Appl. No.: 405,398

[22] Filed: Mar. 15, 1995

Related U.S. Application Data

[63] Continuation of Ser. No. 903,575, Jun. 24, 1992, abandoned.

[30] Foreign Application Priority Data

Jul. 4, 1991 [JP] Japan .................. 3-164607

[51] Int. Cl.⁶ .............................. G06G 7/70; G06F 19/00
[52] U.S. Cl. .................. 364/431.11; 364/424.03; 364/431.12; 395/182.08; 395/182.09; 395/185.08; 395/182.21; 371/37.1; 371/68.1; 123/479; 123/690
[58] Field of Search ................ 364/431.11, 424.03, 364/426.02, 424.05, 426.04, DIG. 1, 578, 133, 943.92, 431.12; 395/575, 425, 185.08, 182.21, 800, 309, 285, 286; 123/479, 589; 371/14, 0.1, 15.1, 16.1, 11.3, 16.3, 62, 12, 68.3, 9, 24, 15, 68.1–68.3, 71; 180/142, 79.1, 140

[56] References Cited

U.S. PATENT DOCUMENTS

| 4,209,828 | 6/1980  | Anderson et al.    | 364/426.05 |
| 4,270,168 | 5/1981  | Murphy et al.      | 395/182.08 |
| 4,531,198 | 7/1985  | Matsuda            | 395/182.21 |
| 4,558,416 | 12/1985 | Pauwels et al.     | 364/431.11 |
| 4,583,176 | 4/1986  | Yamato et al.      | 364/431.11 |
| 4,584,645 | 4/1986  | Kosak              | 364/431.11 |
| 4,587,655 | 5/1986  | Hirao et al.       | 364/431.11 |
| 4,587,939 | 5/1986  | Hemminger et al.   | 364/431.11 |
| 4,597,052 | 6/1986  | Matsuda            | 364/424.03 |
| 4,610,013 | 9/1986  | Long et al.        | 371/9      |
| 4,775,957 | 10/1988 | Yakuwa et al.      | 395/575    |
| 4,843,557 | 6/1989  | Ina et al.         | 364/431.77 |
| 4,850,325 | 7/1989  | Abe et al.         | 123/479    |
| 4,881,227 | 11/1989 | Bühren             | 371/9      |
| 4,886,291 | 12/1989 | Okamoto            | 364/424.05 |
| 5,047,944 | 9/1991  | Ishikawa et al.    | 364/431.11 |
| 5,048,627 | 9/1991  | Eguchi et al.      | 364/424.05 |

Primary Examiner—Gary Chin
Assistant Examiner—Jacques H. Louis-Jacques
Attorney, Agent, or Firm—Beveridge, DeGrandi, Weilacher & Young

[57] ABSTRACT

In a control system for controlling the occurrence of an abnormality in one of the computers mounted on a motor vehicle, a decision is made based upon whether a sub CPU has been reset. In the case where the sub CPU is reset by an abnormality or a malfunction, a failsafe mode flag is set and control data are transmitted again from the main CPU to the sub CPU. The interruption is finished after the control command signal is transmitted to the sub CPU. At this time, if the failsafe mode flag is set, the failsafe control is executed. If the failsafe mode flag is not set, the normal control is executed. Therefore, even if the control data in the RAM of the computers are destroyed by the occurrence of an abnormality or malfunction, the system can regain normal operation immediately.

5 Claims, 3 Drawing Sheets

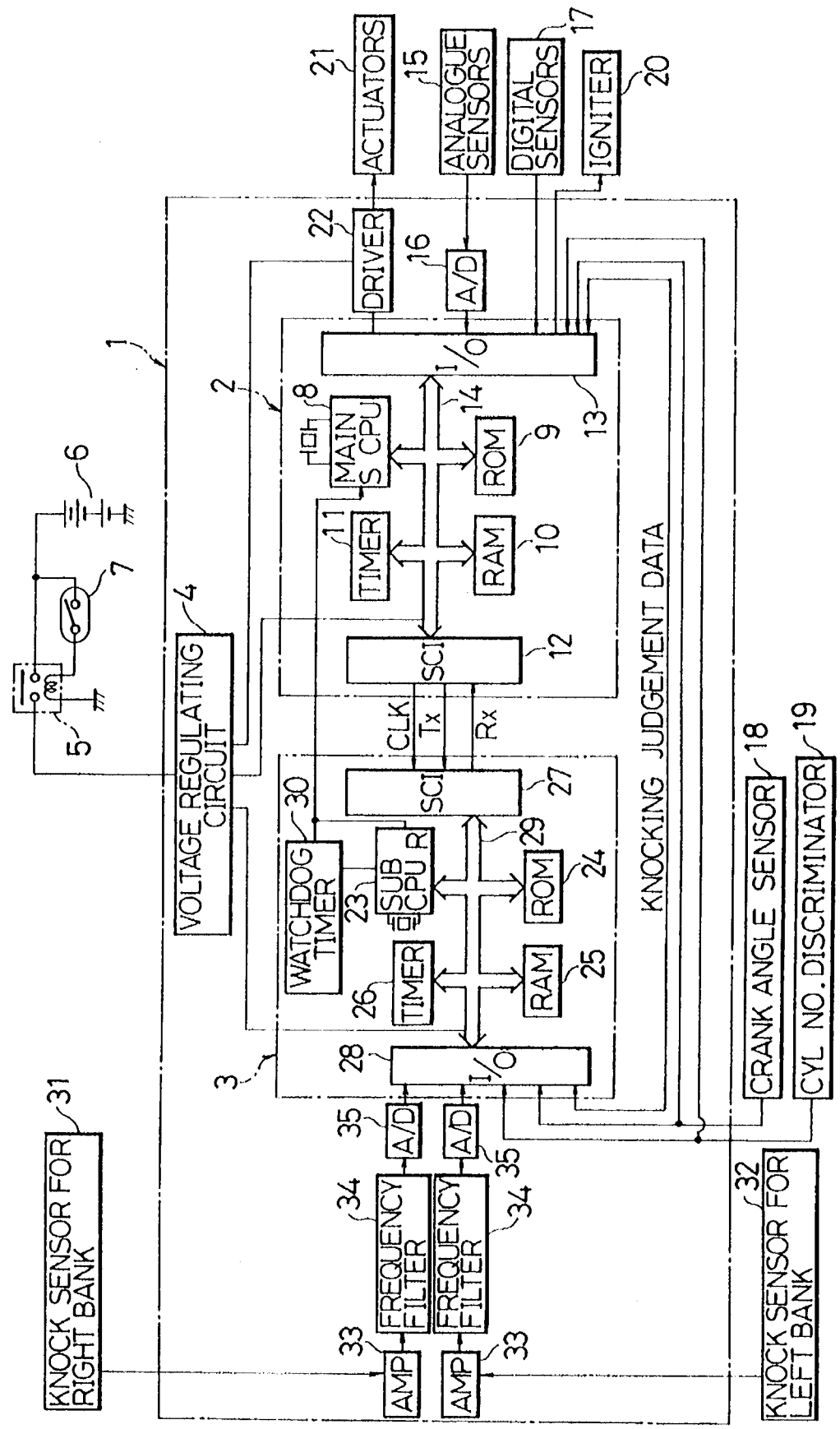

CONTROL METHOD FOR A VEHICLE WITH MAIN AND SUB COMPUTERS

This application is a continuation of application No. 07/903,575, filed Jun. 24, 1992 now abandoned.

BACKGROUND OF THE INVENTION

1. Field of the Invention

The present invention relates to a control method for a vehicle on which a plurality of computers are carried.

2. Description of the Prior Art

In control systems for vehicles such as automobiles, multiprocessor systems each including a plurality of computers have recently been often adopted in order to cope with the increase and complication of control items.

In this case, when any abnormality has occurred, the contents of the RAM of the computer are destroyed, and normal data cannot be held. Therefore, a monitor device for monitoring the occurrence of the abnormality is indispensable. By way of example, the official gazette of Japanese Patent Application Laid-open No. 183254/1988 discloses a monitor device where data are exchanged between two processors insofar as no fault exists, and where the processor causing the error is reset when one of the processors has broken down or when an error has developed in data transfer.

However, in a system wherein the two computers of main and sub ones are connected by communication lines and wherein a control is performed by transferring control data in the ROM of the main computer to the RAM of the sub computer at the time of start, when the occurrence of the abnormality on the sub computer side is dealt with in such a way that the sub computer is reset by an abnormality detection signal from the monitor device so as to clear the contents of the RAM, the resumption of a normal operation becomes difficult. Further, the main computer fails to ensure a normal operation as to a control based on control information from the sub computer.

SUMMARY OF THE INVENTION

The present invention has been made in view of the above circumstances, and has for its object to provide a control method for a vehicle in which, even when control data in the RAM of a computer have been destroyed due to the occurrence of an abnormality, a normal control can be quickly regained.

In the first aspect of performance of the present invention, there is provided a control method for a vehicle having a first computer and a second computer, comprising the steps of monitoring an abnormality occurrence in said second computer; resetting said second computer when said abnormality occurrence is detected; transmitting control data from said first computer to said second computer; determining whether transmitting all of said control data is finished; calculating a sub checksum of said control data; inputting said sub checksum into a main CPU of said first computer; computing a main checksum from said control data in said first computer; checking whether said sub checksum is equal to said main checksum; sending a control start command from said first computer to said second computer; and regaining immediately an optimum control of said vehicle even when said control data are destroyed by said abnormality occurrence.

In the second aspect of performance of the present invention, there is provided a control method for a vehicle having a first computer and a second computer, comprising the steps of monitoring an abnormality occurrence in said second computer; resetting said second computer when said abnormality occurrence is detected; using a failsafe program stored in said first computer; and regaining immediately an optimum control of said vehicle even when said control data are destroyed by said abnormality occurrence.

According to the control method for a vehicle in the first aspect of performance, when the abnormality has occurred in the second computer, the second computer is reset by the monitor means, while at the same time, the control data transferred before the start of the control are retransferred from the first computer.

According to the control method for a vehicle in the second aspect of performance, when the abnormality has occurred in the second computer, the second computer is reset by the monitor means, while at the same time, the control data transferred before the start of the control are retransferred from the first computer, and the failsafe control which does not depend upon the control information from the second computer is executed by the first computer.

BRIEF DESCRIPTION OF THE DRAWINGS

FIG. 4 is a circuit arrangement diagram of a control unit.

PREFERRED EMBODIMENT OF THE INVENTION

Figure 1:
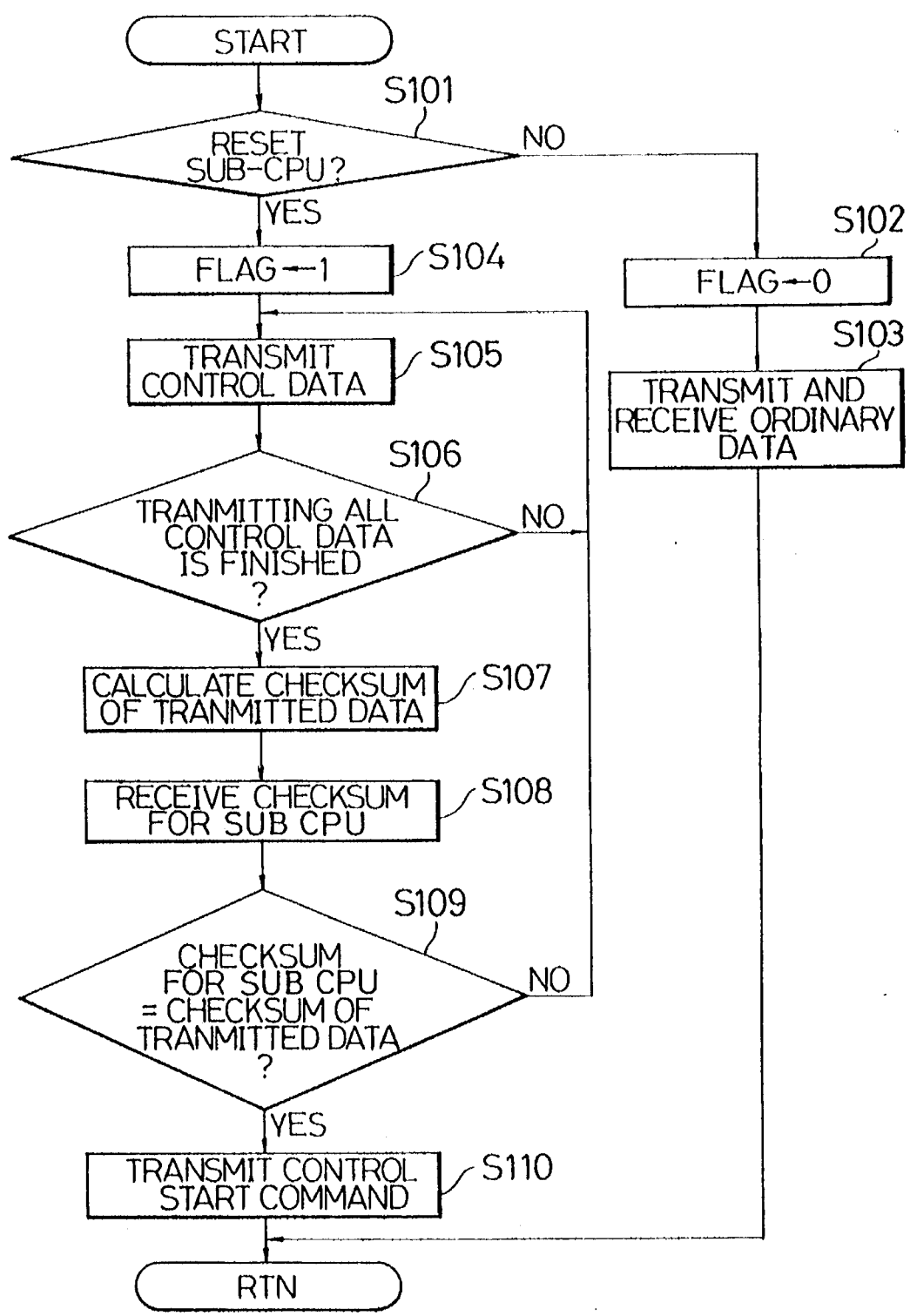
FIG. 1 is a flow chart showing the communication steps of a main CPU side.

Now, an embodiment of the present invention will be described with reference to the drawings. The drawings illustrate one embodiment of the present invention.

Referring to FIG. 4, numeral 1 designates an electronic control unit (ECU) which is carried on a vehicle such as automobile. The ECU 1 is configured of two microcomputers, namely, a first microcomputer 2 which performs the fuel injection control and ignition timing control of an engine by way of example, and a second microcomputer 3 which performs a knocking detection process by way of example.

Besides, the ECU 1 includes a built-in voltage regulating circuit 4, from which stabilized voltages are supplied to various portions. The voltage regulating circuit 4 is connected to a battery 6 through the relay contact of an ECU relay 5. Further, the relay coil of the ECU relay 5 is connected to the battery 6 through an ignition switch 7.

The first microcomputer 2 is such that a main CPU 8, a ROM 9 which stores therein programs for the fuel injection control and the ignition timing control by way of example, a RAM 10 for saving data, a timer 11, a serial interface (SCI) 12, and an I/O interface 13 are interconnected through bus lines 14.

Analog sensors 15 which produce the outputs of analog signals, such as an intake air amount sensor, a throttle opening sensor and a coolant temperature sensor, are connected to the input port of the I/O interface 13 through an A/D converter 16, while digital sensors 17 which produce the outputs of digital signals, such as an idle switch, are directly connected thereto. Further, a crank angle sensor 18 and a cylinder No. discriminator sensor 19 are connected to the input ports of the I/O interface 13.

In addition, an igniter 20 is connected to the output port of the I/O interface 13, while actuators 21, such as an ISCV and an injector, are connected thereto through a driver circuit 22.

On the other hand, the second microcomputer 3 is such that a sub CPU 23, a ROM 24 which stores therein a program for a knocking control by way of example, a RAM 25 for saving data, a timer 26, an SCI 27, and an I/O interface 28 are interconnected through bus lines 29. Further, it is provided with a watchdog timer 30 as monitor means for monitoring the occurrence of any abnormality.

The watchdog timer 30 has its input side connected to the sub CPU 23, and has its output side connected to the reset terminal R of the sub CPU 23 and the signal input monitoring terminal S of the main CPU 8.

Also, the crank angle sensor 18 and the cylinder No. discriminator sensor 19 are directly connected to the input ports of the I/O interface 28, while a knock sensor for a right bank 31 and a knock sensor for a left bank 32 are respectively connected thereto through amplifiers 33, frequency filters 34 and A/D converters 35. Besides, the output port of the I/O interface 28 of the second microcomputer 3 is connected to the input port of the I/O interface 13 of the first microcomputer 2.

After signals from the respective knock sensors 31, 32 have been amplified to predetermined levels by the amplifiers 33, necessary frequency components are extracted by the frequency filters 34. The analog data are converted into digital data by the A/D converters 35.

The first microcomputer 2 and the second microcomputer 3 are interconnected by serial circuit channels which transmit and receive a clock signal CLK, a transmission signal TX and a reception signal RX through the SCI's 12, 27. In synchronism with the clock signal CLK which is supplied from the first microcomputer 2, clock-synchronized bidirectional communications proceed between the first microcomputer 2 and the second microcomputer 3.

In the first microcomputer 2, by way of example, an ignition timing for premium gasoline is calculated on the basis of crank pulses, and an ignition signal is output to a corresponding cylinder when the predetermined ignition timing has been reached. On the other hand, in the second microcomputer 3, the R.P.M. value of the engine is computed from the input intervals of the crank pulses, and the signals from the respective knock sensors 31, 32 are A/D-converted fast in predetermined sampling sections on the basis of the engine R.P.M. and an engine load, so as to convert vibration waveforms into the digital data faithfully, whereby the presence of the occurrence of knocking is judged.

The knocking judgement data as to the presence of the occurrence of knocking is delivered to the I/O interface 28 of the second microcomputer 3. In the case of the occurrence of knocking, the knocking data is transferred from the second microcomputer 3 into the first microcomputer 2 through the serial circuit channel passing the SCI's 27, 12. Then, the first microcomputer 2 immediately delays the ignition timing of the pertinent cylinder on the basis of the knocking data, so as to avoid the knocking.

In this case, when the sub CPU 23 is normal, a monitor signal continues to be supplied from the sub CPU 23 to the watchdog timer 30. Thus, the watchdog timer 30 is periodically cleared and does not produce a reset signal, so that an ordinary control is executed.

In contrast, when the sub CPU 23 has undergone any abnormality and has failed to supply the monitor signal to the watchdog timer 30 within a preset time period, the reset signal of "time-up" is output from the watchdog timer 30. Then, the sub CPU 23 is reset, and the data of the reset signal is stored in the predetermined address of the RAM 10.

As a result, the control data in the ROM 9 are retransferred from the main CPU 8 to the sub CPU 23. Further, a failsafe control is executed for, e.g., the knocking control of the main CPU 8 based on control information from the sub CPU 23, for a time period since the finish of the retransfer of the control data till the resumption of the sub CPU 23 into the normality thereof.

Now, the control steps of the embodiment will be described. A flow chart shown in FIG. 1 indicates an interrupt routine which is interruptively executed by the main CPU 8 of the first microcomputer 2 after initializing the ECU 1 at the closure of the power source thereof, and every predetermined time period.

First, at a step S101, the main CPU 8 reads the data of the reset signal based on the watchdog timer 30, from the predetermined address of the RAM 10, and it decides whether or not the sub CPU 23 has been reset.

Here, in a case where the step S101 has decided that the corresponding data of the reset signal from the watchdog timer 30 is not stored in the RAM 10, so the sub CPU 23 has not been reset, a failsafe mode flag FLAG is cleared (FLAG←0) at a step S102. Subsequently, the control flow proceeds to a step S103, at which ordinary data are transmitted to and received from the sub CPU 23 in accordance with an ordinary communication process, whereupon the routine is quitted.

The failsafe mode flag FLAG is one for discriminating whether the failsafe control or the ordinary control is to be executed. It is referred to in the flow of the control steps of the main CPU 8 to be described later.

In contrast, in a case where the step S101 has decided that the reset signal has been input from the watchdog timer 30, so the sub CPU 23 has been reset, the control flow proceeds to a step S104, at which the failsafe mode flag FLAG is set ((FLAG←1) so as to clear the data of the reset signal of the RAM 10. At a step S105, the control data in the ROM 9 are transmitted to the sub CPU 23 of the second microcomputer 3 through the SCI 12.

Thereafter, the control flow proceeds to a step S106, which checks whether or not the transmission of all the control data has been finished. In a case where the transmission has not been finished, the control flow proceeds back to the step S105 so as to continue the transmission of the control data, and in a case where the transmission has been finished, the checksum of the transmitted data is calculated at a step S107 in the main CPU 8 and the sub CPU 23.

Subsequently, the control flow proceeds to a step S108, at which the main CPU 8 receives a checksum transmitted from the sub CPU 23 of the second microcomputer 3. At a step S109, the main CPU 8 compares the checksum transmitted from the sub CPU 23 with the checksum of the transmitted data calculated in the main CPU 8, thereby to examine whether or not the checksums are in agreement.

In a case where the checksum transmitted from the sub CPU 23 disagrees with that of the transmitted data calculated in the main CPU 8, the step S109 retrocedes to the foregoing step S105, at which the control data in the ROM 9 are transmitted again. In contrast, in a case where the checksum of the sub CPU 23 agrees with that of the transmitted data, the step S109 proceeds to a step S110, at which the main CPU 8 transmits a control start command to the sub CPU 23, whereupon the interrupt is ended.

Figure 2:
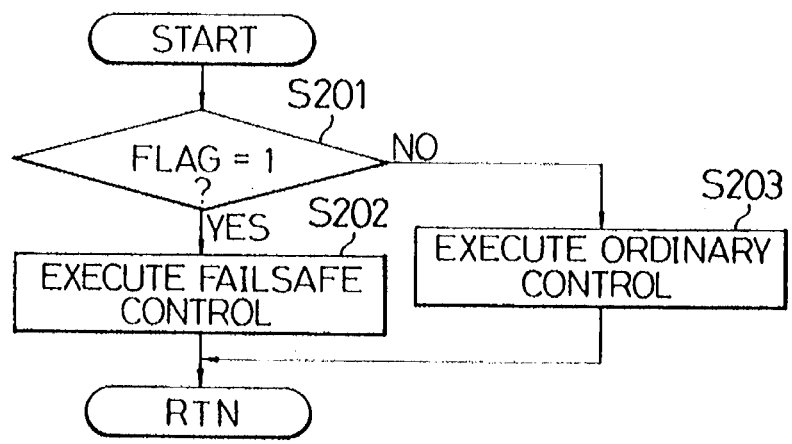
FIG. 2 is a flow chart showing the control steps of the main CPU side.

In addition, the CPU 8 executes the routine of the control steps shown in FIG. 2, interruptively every predetermined time period. At the step S201, the value of the failsafe mode flag FLAG is referred to. Herein, subject to FLAG=1, the step S201 is followed by the step S202, at which the failsafe control is executed, and subject to FLAG=0, the step S201 is followed by the step S203, at which the ordinary control is executed.

More specifically, in the case where the sub CPU 23 has undergone any abnormality and has been reset by the watchdog timer 30, the main CPU 8 cannot obtain accurate knocking information etc. from the sub CPU 23. Therefore, the main CPU 8 stops the feedback control of an ignition timing based on the knocking information and retards the ignition timing a predetermined angle more than an ignition timing for regular gasoline, thereby to keep the vehicle control failsafe.

Figure 3:
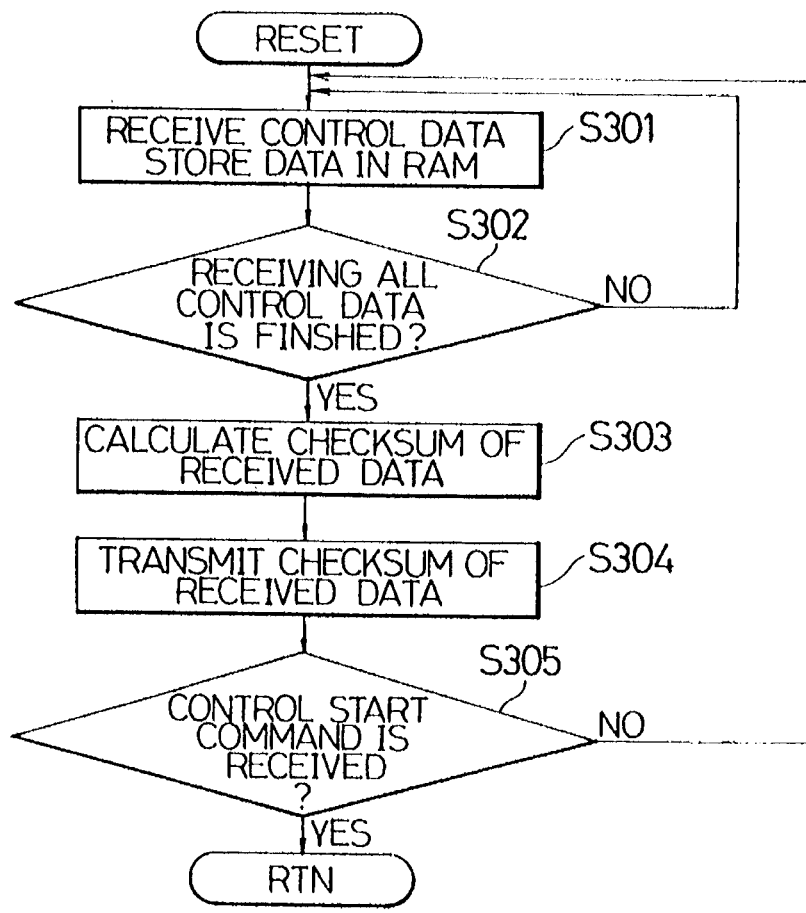
FIG. 3 is a flow chart showing the communication steps of a sub CPU side.

Meanwhile, on the second microcomputer 3, when the sub CPU 23 has been reset at the closure of the power source of the ECU 1 or by the reset signal from the watchdog timer 30, an interrupt routine shown in FIG. 3 is executed by the sub CPU 23. At a step S301, the sub CPU 23 receives control data from the main CPU 8 through the SCI 27 and stores the data to the RAM 25.

Subsequently, the control flow proceeds to a step S302, which checks whether or not the reception of all the control data has been finished. In a case where the reception has not been finished, the control flow retrocedes to the step S301, at which the reception of the control data is continued, and in a case where the reception has been finished, the control flow proceeds to a step S303.

At the step S303, the checksum of the received data is calculated. At a step S304, the sub CPU 23 transmits the calculated checksum to the main CPU 8, and at a step S305, it awaits the reception of a control start command which is transmitted from the main CPU 8. After the control start command has been received, the interrupt is ended.

Thus, even when the data in the RAM 25 have been destroyed due to the occurrence of the abnormality on the second microcomputer 3, the sub CPU 23 is reset, and the control data are retransferred from the main CPU 8. Therefore, the sub CPU 23 can be promptly resumed to the normality, and a damage ascribable to the occurrence of the abnormality can be restrained to the minimum.

By the way, the present invention is not restricted to the embodiment, but it is also allowed to furnish the first microcomputer 2 with the watchdog timer 30 or to endow the sub CPU 23 or main CPU 8 itself with the function of the watchdog timer.

Further, the first microcomputer 2 and the second microcomputer 3 may well be implemented as separate ECU's, and the controls in the respective microcomputers may well be independent of each other.

As described above, according to the present invention, even when control data in the RAM of a microcomputer have been destroyed due to the occurrence of any abnormality, the computer can be quickly resumed to its normality, resulting in such an excellent effect that a damage ascribable to the abnormality can be restrained to the minimum to secure safety.

While the presently preferred embodiment of the present invention has been shown and described, it is to be understood that this disclosure is for the purpose of illustration and that various changes and modifications may be made without departing from the scope of the invention as set forth in the appended claims.

I claim:

1. A control method for a vehicle having a control system mounted on said vehicle for controlling said vehicle, the system including a first computer, a second computer and a watchdog timer for monitoring abnormality occurrences of said second computer, the control method comprising:

monitoring abnormality occurrences in said second computer by said watchdog timer;

resetting said second computer by a reset signal outputted from said watchdog timer when an abnormality occurrence is detected;

setting a failsafe mode flag of said first computer responsive to said reset signal, said failsafe mode flag directing the first computer to operate a failsafe control program which does not depend upon information from said second computer;

transmitting control data from said first computer to said second computer;

determining whether transmission of all of said control data is finished;

calculating a sub checksum of received control data in said second computer;

transmitting said sub checksum from said second computer to said first computer;

computing a main checksum of said control data in said first computer;

determining whether said sub checksum is equal to said main checksum; and when said sub checksum is equal to said main checksum, sending a control start command signal from said first computer to said second computer, thereby regaining immediately control of said vehicle even after said control data has been destroyed by said abnormality occurrence.

2. A control method for a vehicle according to claim 1, wherein operation of said first computer is maintained while said second computer is reset.

3. A control method for a vehicle having a first computer, a second computer and a watchdog timer for monitoring abnormality occurrences of said second computer, the control method comprising:

monitoring abnormality occurrences in said second computer by said watchdog timer;

resetting said second computer by a reset signal generated from said watchdog timer when an abnormality occurrence is detected;

setting a failsafe mode flag in said first computer after receiving a reset signal outputted from said watchdog timer; and activating a failsafe program stored in said first computer when said failsafe mode flag is set, the failsafe program operating independent of control information from said second computer, thereby regaining immediately control of said vehicle even after control data for said second computer has been destroyed by said abnormality occurrence.

4. A control method for a vehicle according to claim 3, further including, when an abnormality occurrence has been detected:

transmitting said control data from said first computer to said second computer;

determining whether transmission of all of said control data is finished;

calculating a sub checksum of received control data in said second computer;

transmitting said sub checksum from said second computer to said first computer;

computing a main checksum of said control data in said first computer;

determining whether said sub checksum is equal to said main checksum; and when said sub checksum is equal to said main checksum, sending a control start command signal from said first computer to said second computer.

5. A control method for a vehicle according to claim 3, wherein operation of said first computer is maintained while said second computer is reset.

* * * * *